Nov. 30, 1965   J. S. MALSBARY ETAL   3,221,280
SATURABLE REACTOR CONTROL
Filed Jan. 23, 1961   2 Sheets-Sheet 1
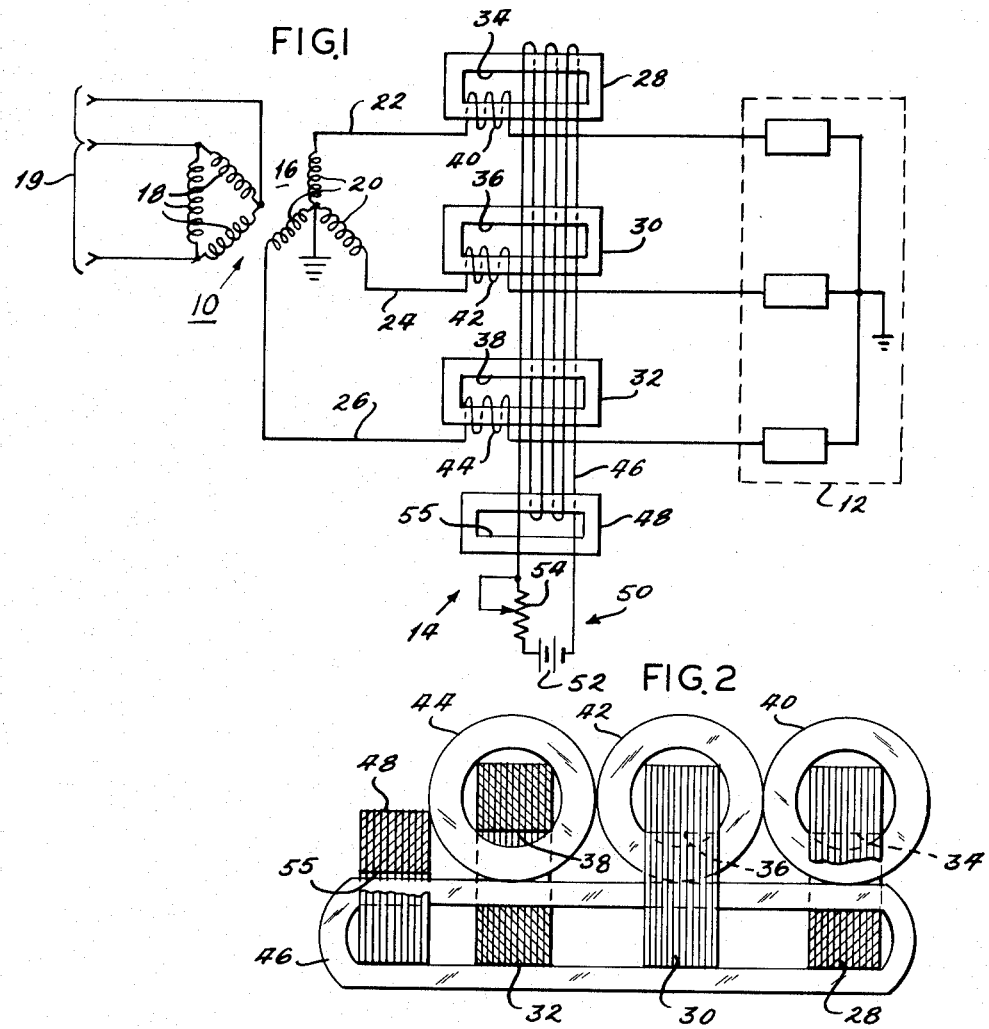
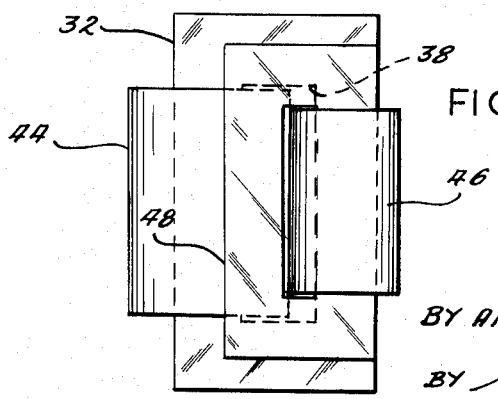
INVENTORS:
JAMES S. MALSBARY
ERWIN B. HILKER, DECEASED
BY ANNAMARY HILKER, ADMINISTRATRIX
BY Gravely, Lieder & Woodruff
ATTORNEYS.

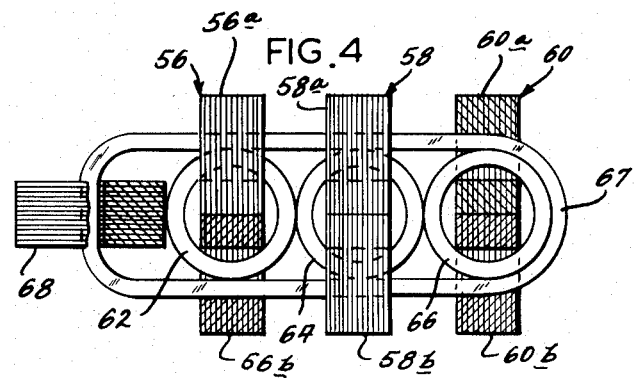
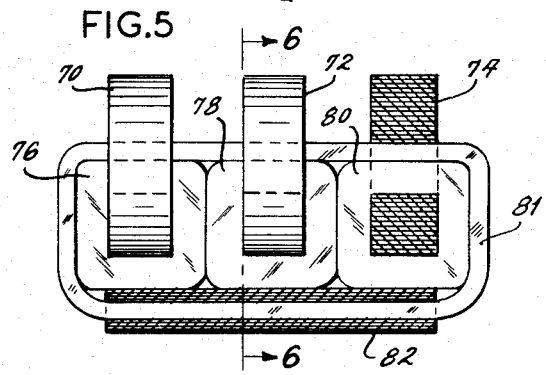
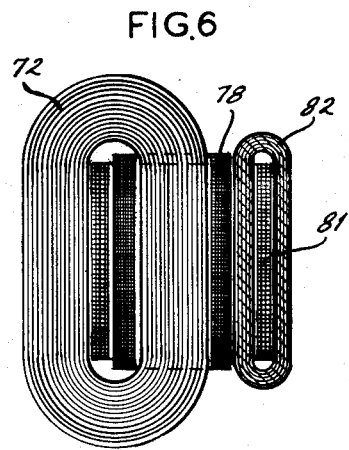
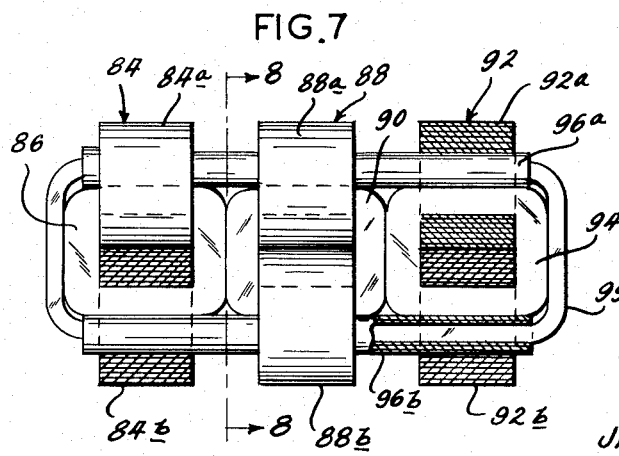
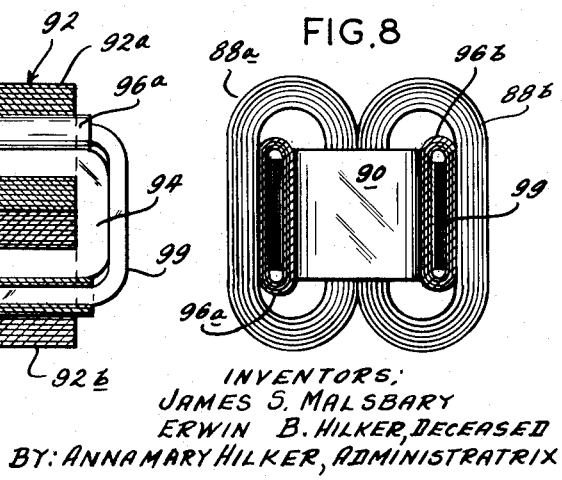
INVENTORS:
JAMES S. MALSBARY
ERWIN B. HILKER, DECEASED
BY: ANNAMARY HILKER, ADMINISTRATRIX
ATTORNEYS.

3,221,280
Patented Nov. 30, 1965

3,221,280
SATURABLE REACTOR CONTROL
James S. Malsbary, Glendale, Mo., and Erwin B. Hilker, deceased, late of St. Louis, Mo., by Annamary Hilker, administratrix, St. Louis, Mo., assignors to Wagner Electric Corporation, St. Louis, Mo., a corporation of Delaware
Filed Jan. 23, 1961, Ser. No. 84,455
22 Claims. (Cl. 336—5)

This invention relates to electrical control apparatus and more particularly to saturable reactor apparatus.

Saturable reactors include control and main reactance windings inductively related on magnetic core means wherein the control winding can be energized from a source of control current for controlling the saturation of the core and the reactance of the main winding.

Because the control and main windings are inductively related, the windings must be arranged on the core structure in a manner to obviate the flow of alternating current of the supply frequency in the control winding. Various well-known winding and core arrangements have been used to obviate the flow of induced currents in the control winding, and these arrangements usually require that one of both of the control and main windings be divided into two partial windings or separate coils, such windings being known as split or two-coil windings. For example, two main winding coils may be placed on the outer legs of a two-window or three-legged core and a single-coil control winding on the center leg. With such an arrangement, the main coils are connected in the electrical system and related to each other such that the alternating fluxes oppose one another in the center leg and no voltage of the supply frequency is induced in the control winding. Another well-known arrangement is to employ two single-window cores, each containing one coil of a two-coil control winding and one coil of a two-coil main winding, and with the two control coils so connected that the voltages induced in the two coils are in opposition. With these arrangements, substantially no alternating current of the supply frequency flows in the control winding circuit; however, such reactors are relatively expensive since they require two separate fully insulated main coils, two separate magnetic cores or the equivalent three-legged core, and one or two insulated control coils. Such reactor constructions are especially expensive where they are used to control the flow of power in a polyphase electrical system. For example, in three-phase systems, a total of six separate reactance coils, six magnetic cores (or three three-legged cores), and usually three or six separate control coils is required.

In three-phase systems, reactor constructions have been used which include an undivided or single-coil main winding in each phase of the system and with a control winding coil or coils for controlling the reactance of the main coils. Such three-phase reactor apparatus operates satisfactorily under balanced load conditions since the algebraic sum of magnetic fluxes in any balanced three-phase system is equal to zero. However, with such a reactor construction, induced alternating currents of the supply frequency would flow in the control winding circuit if the load is unbalanced. For this reason, such reactor apparatus has had very limited use.

In accordance with the present invention, saturable reactor apparatus is provided which is particularly simple and economical to manufacture. In accordance with one aspect of the present invention, there is provided saturable reactor apparatus having an undivided main winding on saturable magnetic core means, an undivided control winding linking the core means, and auxiliary core means linking the control winding whereby the control winding presents a relatively high impedance to the flow of any induced current therein.

It is therefore an object of the present invention to provide a novel saturable reactor apparatus which is especially economical to manufacture.

Another object is to provide an economical saturable reactor apparatus requiring a minimum number of parts.

Another object is to provide a saturable reactor apparatus which does not require divided reactance or control windings to prevent the flow of induced alternating current of the supply frequency in the control winding.

Another object is to provide an economical saturable reactor apparatus for connection in a polyphase system wherein the apparatus has a minimum number of separate coils.

Another object is to provide polyphase saturable reactor apparatus for use in a polphase electrical system having a single-coil main winding for each phase and a common single-coil control winding for controlling the reactance of all of the main winding coils, and wherein alternating current of the supply frequency is substantially prevented from flowing in the control winding whether or not the load of the system is balanced.

Further objects and advantages of the present invention will be apparent from the following detailed description, reference being had to the drawings wherein preferred embodiments of the present invention are clearly shown.

In the drawings, FIG. 1 is a schematic diagram of an electrical system utilizing saturable reactor apparatus in accordance with one embodiment of the present invention, FIG. 2 is a plan view, partly in section, of the reactor apparatus schematically represented in FIG. 1, FIG. 3 is a left-end view of the reactor apparatus of FIG. 2, shown rotated through 90 degrees, FIG. 4 is a plan view, partly in section, of saturable reactor apparatus according to another embodiment of the present invention, FIG. 5 is a plan view, partly in section, of saturable reactor apparatus according to another embodiment of the invention, FIG. 6 is a sectional view taken along the line 6—6 of FIG. 5, shown rotated through 90 degrees, FIG. 7 is a plan view, partly in section, of saturable reactor apparatus according to still another embodiment of the present invention, and FIG. 8 is a sectional view taken along the line 8—8 of FIG. 7, shown rotated through 90 degrees.

In FIG. 1 of the drawings, there is shown for illustration, a three-phase electrical supply system including an alternating current supply circuit 10 connected to supply power to a load circuit 12 through saturable reactor apparatus 14 in accordance with one embodiment of the present invention. While reactor apparatus 14 may be utilized in any suitable three-phase system, the supply circuit 10 of the system is shown as including a three-phase transformer 16 having primary windings 18 connected to a three-phase alternating current source 19, and Y or star connected secondary windings 20 having their free ends connected respectively to three supply leads 22, 24 and 26 and their other ends grounded. The load 12 is shown by way of illustration as a Y-connected three-phase load which is also provided with a grounded neutral to provide a neutral return for the system.

Saturable reactor apparatus 14 includes magnetic core means in the form of three like main magnetic cores 28, 30 and 32 having core windows 34, 36 and 38, respectively. Main cores 28, 30 and 32 contain three single-phase main or reactance windings 40, 42 and 44, respectively. The three main windings are respectively connected to the three supply leads 22, 24 and 26 and in series circuit relation between the supply circuit 10 and load circuit 12.

A direct current control winding 46 inductively links all three main cores as well as an auxiliary magnetic core 48, which will be more fully explained hereinafter. The control winding is connected to a direct current control source indicated generally at 50. The source 50 may be any suitable source of control current and is shown for illustration as including a battery 52 connected in series with a potentiometer 54.

Since the control winding 46 links all three main cores 28, 30 and 32, current flowing through the control winding produces direct current fluxes in the three cores thereby determining the magnetic saturation of the cores and the reactance of all three main windings. It will be apparent that increasing the direct current in the control winding 46 decreases the reactance of the three main windings, and that decreasing the direct current increases the reactance of the three main windings. The magnitude of the direct current flowing in the control winding 46 may be varied by moving the movable arm of potentiometer 54. By varying the direct current in the control winding, the reactance of the main windings is varied and therefore the current flowing through the load. The load, of course, may be any suitable type of load, for example, a lamp load where it is desired to control the current through the lamps for lighting control purposes.

Referring now also to FIGS. 2 and 3, each of the single-phase main windings 40, 42 and 44, is an undivided or single-coil winding and is shown in the form of a single insulated coil which, for example, may be of the form-wound type. Each main winding is linked by its associated main core. Each of the main cores 28, 30 and 32 is shown as a closed single-phase magnetic core of rectangular configuration. The control winding 46 is also an undivided or single-coil winding which may be in the form of a single insulated coil such as a form-wound coil. The control winding coil 46, as shown, passes through the three main core windows 34, 36 and 38, as well as through the auxiliary core window which is indicated at 55, each window of the main cores being substantially filled by the control coil and main coil. The control winding coil thus links and encircles a portion of the auxiliary core and each main core. While each main core links its associated main coil and the control coil, the auxiliary core links only the control coil. As illustrated, auxiliary core 48 is a separate closed rectangularly shaped laminated core which is exterior of the main coils but surrounds a portion of control coil 46. The auxiliary core and each of the main cores are shown as single-window cores of laminated magnetic material.

In operation, when the load is balanced, no resultant induced alternating voltage of the supply frequency is induced in the control winding and no induced alternating current of the supply frequency flows in control windings 46 since the algebraic sum of the magnetic fluxes in the three-phase balanced magnetic circuit is equal to zero.

If it is now assumed that the load becomes unbalanced, for example, by the addition of a single-phase load or an open circuit in one of the phases, the algebraic sum of the magnetic fluxes will no longer be equal to zero. Under these conditions, a resultant voltage is induced in control winding 46 tending to cause the flow of alternating current of the supply frequency therein. However, since the control winding links auxiliary core 48, the flow of induced alternating current causes alternating flux in the auxiliary core thereby producing counter E.M.F.'s of self-induction in the control winding which oppose the flow of induced alternating current therein. In other words, since the auxiliary core links the control winding, the effective impedance of the control winding is made relatively high so that little or substantially no induced alternating current flows in the control winding circuit. Because of the presence of auxiliary core 48, alternating currents of the supply frequency, as well as even and odd harmonics of the supply frequency, are maintained at very low values.

Good results have been obtained using an auxiliary core having a cross-sectional area equal to that of one main core. With such a construction, it was found that induced alternating current in the control winding were maintained at very low values when the load was unbalanced, and even when one of the phases of the three-phase system was opened. With the auxiliary core having a cross-sectional area equal to that of one main core, the resultant inducing voltage may be as high as the full line voltage while the induced current in the control winding remains very small.

In FIG. 2, control winding 46 surrounds the main core legs opposite the legs on which the reactance winding coils are disposed; however, the control winding coil may be arranged, where desired, so that it surrounds the three reactance winding coils.

In FIG. 4, there is shown a modified embodiment of the invention in which the control winding surrounds the three single-phase main windings of the three-phase reactor apparatus. In this construction, three single-phase main magnetic cores 56, 58 and 60 are shown divided into two parts each, the main cores being of the well-known "split" or "shell" type construction. Each part of a main core is generally referred to as a half core, and each main core and its half cores are identified by the same reference numeral with the subscripts $a$ and $b$ added to the numerals for the half cores. The use of half cores requires less total magnetic material than a single full core, and are often used in making reactors of relatively large size. Three single-coil main windings 62, 64 and 66 are shown disposed in row formation on the main cores 56, 58 and 60, respectively, with each main winding coil surrounding the adjacent legs of the half cores of each main core. A single-coil control winding 67 for controlling the reactance of all three main winding coils, is shown surrounding the main coils and being linked by an auxiliary core 68. Control coil 67 passes through the window of each of the half cores as well as the window of auxiliary core 68 so that it inductively links the auxiliary and main cores. Core 68 links the control winding coil but does not link the main coils. The cross-sectional area of core 68, as shown, is substantially equal to the effective cross-sectional area of one main core, in this case, the sum of the cross-sectional areas of two half cores.

The magnetic cores in the embodiments illustrated in FIGS. 2 and 4 are rectangular in shape and may be made by stacking punched laminations of magnetic material such as grain orientated magnetic steel. If desired, these cores may be of the well-known wound core type, that is, cores made by bending magnetic sheet material flatwise into the shape desired. Wound cores may be made, for example, by winding the magnetic sheet material on a mandrel into the desired core shape, annealing the wound core material, cutting the material into sections, and then inserting the sections through the winding coil to build up the sections into a core linking the winding. Wound-type cores are shown in the modified embodiment illustrated in FIGS. 5 and 6 where the single-phase main magnetic cores are indicated at 70, 72 and 74. Single-phase main windings 76, 78 and 80, of single coil construction, are disposed on the cores 70, 72 and 74, respectively.

The main coils and cores are positioned adjacent one another in a row with a single-coil control winding 81 extending through the windows of the main cores as well as the window of an auxiliary core 82 disposed adjacent the sides of the three main coils. Auxiliary core 82 is also of the wound-type but is made from relatively wide magnetic sheet material, it being shown much wider than any of the main cores. By employing an auxiliary core having a relatively large width with respect to that of one main core, only relatively few layers or turns of magnetic material are needed to provide sufficient core material to raise the impedance of the control winding to a suitable level. With an auxiliary core having a relatively large width compared to a main core, its thickness or shortest cross-sectional dimension may be considerably less than that of a main core, as will be apparent from the reactor apparatus shown in FIG. 5. The cross-sectional area of auxiliary core 82 is shown approximately equal to that of one of the main cores.

Control winding 81 in FIG. 5 links all three main cores 70, 72 and 74 as well as auxiliary core 82 but auxiliary core 82 links only the control winding. In this way, the control winding coil is effective, when energized, to control the reactance of all three main coils, while auxiliary core 82 is effective in raising the impedance of the control winding to limit any induced current in the control winding to a minimum. This arrangement of cores, and coils results in a very compact, substantially self-supporting, three-phase saturable reactor apparatus.

In the modified embodiment shown in FIGS. 7 and 8, the three main cores are wound-type single-phase cores and of shell type construction. A main core 84 includes half cores 84a and 84b with a single-coil main winding 86 surrounding the adjacent legs of the half cores. Another main core 88 includes half cores 88a and 88b linking a single-coil main winding 90 which is disposed around the adjacent legs of the half cores. Similarly, the third main core indicated at 92, includes half cores 92a and 92b linking a single-coil main winding 94 which surrounds the adjacent legs of these half cores. The auxiliary core in this embodiment is divided into two equal relatively wide thin core sections 96a and 96b and each is of the wound core construction. The single-phase main winding coils are disposed adjacent one another in a row and auxiliary core sections 96a and 96b extend along opposite sides of the row of main coils. Auxiliary core section 96a extends through the windows of main half cores 84a, 88a and 92a while auxiliary core section 96b extends through main half cores 84b, 88b and 92b. A single-coil control winding 99 extends through the windows of the two auxiliary core sections 96a and 96b and surrounds the three main windings 86, 90 and 94, and thus links all the main cores as well as the auxiliary core. This arrangement provides a very compact three-phase saturable reactor apparatus.

In the modified embodiment shown in FIGS. 7 and 8, each main half core surrounds a portion of its associated main coil, auxiliary core section, and control winding coil 99. Each of the two sections of the auxiliary core in this case is shown with a cross-sectional area substantially equal to that of a main half core so that the total effective cross-sectional area of the auxiliary core will be substantially equal to the total effective cross-sectional area of one main core.

In all of the illustrated embodiments, the control winding coil inductively links all of the main magnetic cores and the auxiliary core, while the auxiliary core links only the control winding coil. Each of the auxiliary cores is shown as a separate core in direct inductive relation to the control coil but independent of the main coils and substantially does not affect the exciting current in the main coils. In each of the constructions, any induced alternating current in the control winding coil will be opposed by M.M.F.'s of self-induction resulting from the flow of alternating flux in the auxiliary core.

It will be apparent that reactor apparatus of the present invention is economical to manufacture, it requiring a minimum number of separate parts. For example, in the three-phase apparatus in each of the embodiments shown and described herein, only a single undivided main winding per phase is required and a common undivided control winding is used to control the reactance of all the main windings. This is made possible by the use of the auxiliary core linking the control winding coil which effectively increases the reactance of the control winding to limit the flow of induced current in the control winding.

While only one control winding has been shown in each of the embodiments illustrated herein, more than one control winding may be used where desired. For example, single-coil control windings such as bias and feed-back windings may also be positioned with the control winding shown so that they link the main cores as well as the auxiliary core. Also, while saturable reactor apparatus having three main windings for connection in a three-phase electrical system has been shown and described herein, reactor apparatus having any number of main windings may be used with a control winding and auxiliary core arrangement in accordance with the teachings of the present invention.

It is to be understood that the foregoing description and accompanying drawings have been given only by way of illustration and example, and that alterations and changes in the present disclosure, which will be readily apparent to one skilled in the art, are contemplated as within the scope of the present invention, which is limited only by the claims which follow.

What is claimed is:

1. A saturable reactor apparatus for connection in an electrical system having an input circuit connectable to an alternating current supply source, and an output circuit connectable to a load, said apparatus comprising a magnetic core, a main reactance winding having a plurality of turns encircling said core and connected in series relation between said input and output circuits, control winding means having a plurality of turns encircling said core and being in direct inductive relation with said main winding whereby said control winding means is subject to having a voltage induced therein of the supply frequency, and means for limiting induced current flow in said control winding means resulting from said induced voltage, said means including an additional magnetic core encircled only by said turns of said control winding means.

2. Saturable reactor apparatus for connection in an alternating current supply circuit comprising a single-phase magnetic core, an undivided main winding on said core connected in said supply circuit, an undivided control winding having a plurality of turns inductively coupled to said main winding, said control winding being adapted to be energized from a source of control current for controlling the reactance of said main winding, said control winding being subject to induced current flow therein of the supply frequency resulting from the inductive coupling between said main winding and said control winding, and means for reducing the magnitude of said induced current flow in said control winding, said last named means including an auxiliary core encircled by said turns and being in inductive relation with only said control winding.

3. A saturable reactor apparatus for connection in a polyphase electrical system comprising a plurality of main windings according to the number of phases, magnetic core means providing a magnetic circuit for each of said windings, auxiliary magnetic core means, and control winding means disposed in direct inductive relationship with the magnetic circuit of each of said main windings and said auxiliary core means, said auxiliary core means being physically linked in direct inductive relationship with said control winding means only.

4. Saturable reactor apparatus for connection in a polyphase electrical system comprising a plurality of main magnetic cores according to the number of phases of said system, a main winding on each of said cores, an auxiliary magnetic core, and a control winding encircling a portion of each of said main cores and a portion of said auxiliary core in direct inductive relationship therewith, said auxiliary core being physically linked in direct inductive relationship with only said control winding.

5. Reactor apparatus for connection in a polyphase electrical system comprising main magnetic core means, a plurality of single-coil main windings according to the number of phases, each of said main windings inductively linking said core means, control winding means linking said core means in direct inductive relation with all of said main windings, and an auxiliary magnetic core physically linking in direct inductive relationship only said control winding means.

6. Saturable reactor apparatus for connection in a polyphase electrical system comprising magnetic core means including a closed magnetic core for each phase of the system, a plurality of reactance windings each linking one of said cores, an auxiliary magnetic core exterior of said reactance windings, and a single-coil control winding physically linking and in direct inductive relationship with all of said single-phase magnetic cores and said auxiliary core, said auxiliary core being physically linked in direct inductive relationship by said control winding only.

7. A saturable reactor for connection in a polyphase electrical system comprising main magnetic cores according to the number of phases of the system, a single-coil main winding on each of said main cores, single-coil control winding means linking each of said main cores and in direct inductive relationship with all of said main windings, and an auxiliary core physically linking in direct inductive relationship only said control winding means.

8. Saturable reactor apparatus for connection in a polyphase electrical system comprising for each phase of the system a single-phase core and a single-coil reactance winding on the core, single-coil control winding means linking all of said cores in direct inductive relationship therewith and adapted for connection to a source of D.C. control current for producing direct current control fluxes in each of said cores, and a separate auxiliary core physically linking in direct inductive relationship only said control winding means.

9. A saturable core reactor apparatus for controlling the flow of power in a polyphase electrical system comprising a plurality of separate main magnetic cores according to the number of phases of the system, each of said main cores having a window for the reception of windings, a plurality of single-coil main windings one for each of said main cores, each of said windings passing through the window of its associated main core, single-coil control winding means passing through the windows of all of said main cores, and an auxiliary core exterior of said main windings physically linking in direct inductive relationship only said control winding means.

10. In a three-phase saturable core reactor for supplying power from a power input circuit to a load circuit including a main magnetic core and a single-coil main winding on the core connected in each phase of the system, and a single-coil control winding linking all of said cores in direct inductive relationship with each of said main windings and adapted to be energized by a source of control current for controlling the reactance of all of said main windings and wherein the control winding is subject to induced current flow therein in response to unbalanced load conditions, the improvement therein comprising an additional magnetic core physically linking in direct inductive relationship only said control winding to thereby increase the reactance of said control winding and limit the flow of said induced current therein.

11. Reactor apparatus for connection in a polyphase electrical system comprising an undivided reactance winding for each phase of the system, like single-phase main magnetic cores one for each of said windings, an auxiliary magnetic core exterior of said main windings, and an undivided control winding linking all of said main cores and said auxiliary core, said auxiliary core having a cross-sectional area substantially equal to the cross-sectional area of one of said main cores.

12. A polyphase saturable core reactor comprising a plurality of wound-type single-phase main cores according to the number of phases of the system, a plurality of single-coil main windings according to the number of phases each linked by one of said main cores, single-coil control winding means linked in direct inductive relationship by each of said main cores, and an auxiliary wound-type core physically linking in direct inductive relationship only said control winding means and having a width greater than the width of any of said main cores.

13. Polyphase saturable reactor apparatus for controlling the flow of power in a polyphase electrical system comprising a single-coil reactance winding and a main single-phase wound-type magnetic core linking in direct inductive relationship the reactance winding for each phase of the system, a single-coil control winding disposed in inductive relation with all of said main cores, and an auxiliary wound-type magnetic core physically linking in direct inductive relationship only said control coil, at least a portion of one of said main cores encircling said auxiliary core.

14. A polyphase saturable reactor for connection in a polyphase electrical system comprising a plurality of main magnetic cores according to the number of phases of the system, each of said main cores including at least two separate core sections each having a core window, a plurality of single-coil main windings each associated with one of said main cores, each of said windings passing through the windows of the core sections of its associated main core, a single-coil control winding passing through all of the windows of said core sections and surrounding said main windings, and auxiliary magnetic core means physically linking in direct inductive relationship only said control winding.

15. Polyphase saturable reactor apparatus for connection in a polyphase electrical system comprising a plurality of wound-type main magnetic cores according to the number of phases of the system, a single-coil main winding for each phase of the system each linking one of said main cores, said main windings being disposed in row formation, a wound-type auxiliary magnetic core adjacent one side of said row of main windings, and a single-coil control winding linking all of said cores.

16. Three-phase saturable reactor apparatus for connection in a three-phase electrical system comprising three wound-type main magnetic cores, three single-coil main windings each linked by one of said main cores, said main windings being disposed in row formation, a wound-type auxiliary magnetic core disposed adjacent one side of said row of main windings exterior of said main windings, and a single-coil control winding linking each of said main cores and said auxiliary core and surrounding said main windings.

17. Saturable core reactor apparatus for connection in a polyphase electrical system comprising a plurality of main single-phase magnetic cores according to the number of phases of the system, a plurality of single-coil main windings one on each of said main cores, an auxiliary wound-type magnetic core having its smallest dimension in cross-section smaller than the smallest dimension of each of said main cores in cross-section, and its greatest dimension in cross-section greater than the greatest dimension of each of said main cores in cross-section, and single-coil control winding means linking all of said main single-phase magnetic cores and said auxiliary magnetic core, said auxiliary magnetic core physically linking in direct inductive relationship only said control winding means.

18. A polyphase saturable core reactor for connection in a polyphase system comprising a plurality of main wound-type magnetic cores according to the number of phases of the system, each of said main cores including at least two core parts, a single-coil main winding associated with each main core, each main winding linking the two core parts of its associated main core, said main windings being disposed in row formation, a pair of wound-type auxiliary core sections with one disposed on each side of said row of main windings, each of said core parts encircling a portion of one of said auxiliary core sections, and a single-coil control winding linking all of said core parts and said core sections.

19. A reactor apparatus comprising a pair of magnetic cores, and a pair of winding means for respective connection in electric power supply and control circuits each having a plurality of turns, one of said cores being encircled by said turns of each of said winding means with said control circuit winding means being subject to having voltage of the supply frequency induced therein, the other of said cores being encircled by said turns of only said control circuit winding means.

20. A reactor apparatus comprising a pair of magnetic cores, a reactance winding for connection in an alternating current supply circuit, and control winding means for connection in a control circuit for controlling the reactance of said reactance winding, one of said cores being encircled in direct inductive relationship by said reactance winding, said control winding means including a plurality of turns encircling said one core so that said control winding means is subject to having induced current flow therein of the frequency of the current flow in said reactance winding due to the inductive relationship therebetween, the other of said cores being encircled by said plurality of turns and being in direct inductive relationship with only said control winding means for limiting the flow of said induced current.

21. A reactor apparatus comprising a pair of closed saturable magnetic cores having substantially equal cross-sectional areas, a single-coil reactance winding having a plurality of turns and adapted for connection in an electric power circuit having an alternating current supply source, and control winding means having a plurality of turns and adapted for connection in a direct current control circuit for controlling the reactance of said reactance winding, one of said cores having a portion thereof encircled by said turns of said reactance winding and said control winding means with said control winding means being subject to having voltage of the supply frequency induced therein, the other of said cores being encircled by only said turns of said control winding means and being in direct inductive relationship with said control winding means only to thereby substantially obviate the flow of current induced in said control winding means.

22. A reactor apparatus comprising a main magnetic core, a single-coil reactance winding encircling a portion of said main core in direct inductive relation therewith for connection in an alternating current supply circuit, control winding means having a plurality of turns encircling said main core in direct inductive relationship with said reactance winding and subject to having voltage and current of the supply frequency induced therein due to the direct inductive relationship between said control winding means and said reactance winding, said control winding means being adapted for connection in a control circuit for controlling the reactance of said reactance winding, and another magnetic core having a portion encircled by said turns and in direct inductive relationship with said control winding means only to thereby substantially reduce the flow of induced current in said control winding means.

References Cited by the Examiner

UNITED STATES PATENTS

| | | | |
|---|---|---|---|
| 1,586,885 | 6/1926 | Elmen | 323—89.11 |
| 1,612,084 | 12/1926 | Weed | 323—89.11 |
| 2,644,109 | 6/1953 | Mulder | 336—155 X |
| 2,994,816 | 8/1961 | Fitzgerald | 323—89 X |

FOREIGN PATENTS 299,500   3/1954   Switzerland.

OTHER REFERENCES

Ser. No. 239,432, Koppelman et al. (A.P.C.), published May 18, 1943.

LLOYD McCOLLUM, *Primary Examiner.*

MILTON O. HIRSHFIELD, *Examiner.*